United States Patent
Petersson et al.

(10) Patent No.: US 9,960,828 B2
(45) Date of Patent: May 1, 2018

(54) BEAM FORMING USING AN ANTENNA ARRANGEMENT

(71) Applicant: TELEFONAKTIEBOLAGET L M ERICSSON (PUBL), Stockholm (SE)

(72) Inventors: Sven Petersson, Sävedalen (SE); Fredrik Athley, Kullavik (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 317 days.

(21) Appl. No.: 14/358,014

(22) PCT Filed: May 8, 2014

(86) PCT No.: PCT/EP2014/059440
§ 371 (c)(1),
(2) Date: May 13, 2014

(87) PCT Pub. No.: WO2015/169366
PCT Pub. Date: Nov. 12, 2015

(65) Prior Publication Data
US 2015/0326299 A1 Nov. 12, 2015

(51) Int. Cl.
*H04B 7/06* (2006.01)
*H01Q 21/06* (2006.01)
(Continued)

(52) U.S. Cl.
CPC ......... *H04B 7/0626* (2013.01); *H01Q 21/061* (2013.01); *H04B 7/0491* (2013.01);
(Continued)

(58) Field of Classification Search
CPC ... H04B 7/0626; H04B 7/0617; H04L 5/0026; H04L 5/0048
See application file for complete search history.

(56) References Cited

U.S. PATENT DOCUMENTS

2003/0162566 A1 8/2003 Shapira et al.
2004/0063468 A1* 4/2004 Frank .................. H04B 7/0408
455/561
(Continued)

FOREIGN PATENT DOCUMENTS

EP 2685755 A1 1/2014
WO 2013181850 A1 12/2013

OTHER PUBLICATIONS

International Search Report of the International Searching Authority dated Jul. 23, 2014, in International Application No. PCT/EP2014/059440, 5 pages.

*Primary Examiner* — Alpus H Hsu
*Assistant Examiner* — Anthony Luo
(74) *Attorney, Agent, or Firm* — Rothwell, Figg, Ernst & Manbeck, P.C.

(57) ABSTRACT

There is provided beam forming using an antenna array. The antenna array is configured to transmit across an angular sector. The angular sector is divided into at least two sub-sectors by respective port weights being applied to respective physical antenna ports of the antenna array. A respective set of virtual antenna ports is determined for each sub-sector. A first set of reference signals for acquiring channel state information on the set of virtual antenna ports is alternatingly transmitted in each one of the at least two sub-sectors.

24 Claims, 4 Drawing Sheets (51) Int. Cl.
    *H04L 5/00*          (2006.01)
    *H04B 7/08*          (2006.01)
    *H04W 16/28*        (2009.01)
    *H04B 7/0491*       (2017.01)
    *H04B 7/0417*       (2017.01)

(52) U.S. Cl.
    CPC ......... *H04B 7/0617* (2013.01); *H04L 5/0026* (2013.01); *H04L 5/0048* (2013.01); *H04B 7/0417* (2013.01); *H04B 7/086* (2013.01); *H04W 16/28* (2013.01)

(56) References Cited

U.S. PATENT DOCUMENTS

| | | | |
|---|---|---|---|
| 2004/0136342 A1 | 7/2004 | Pedersen et al. | |
| 2009/0041150 A1 | 2/2009 | Tsai et al. | |
| 2013/0070719 A1* | 3/2013 | Xu | H04L 5/005 370/329 |
| 2013/0201912 A1* | 8/2013 | Sheng | H04B 7/0413 370/328 |
| 2014/0098689 A1* | 4/2014 | Lee | H04B 7/0469 370/252 |
| 2015/0131750 A1* | 5/2015 | Xue | H04B 7/0482 375/267 |
| 2015/0229375 A1* | 8/2015 | Vook | H04B 7/0469 370/329 |

* cited by examiner

Fig. 10 (State of the Art)

Fig. 11

BEAM FORMING USING AN ANTENNA ARRANGEMENT

CROSS REFERENCE TO RELATED APPLICATION(S)

This application is a 35 U.S.C. § 371 National Phase Entry Application from PCT/EP2014/059440, filed May 8, 2014, designating the United States, the disclosure of which is incorporated herein in its entirety by reference.

TECHNICAL FIELD

Embodiments presented herein relate to beam forming, and particularly a method, an antenna arrangement, and a computer program for beam forming.

BACKGROUND

In communications networks, it may be challenging to obtain good performance and capacity for a given communications protocol, its parameters and the physical environment in which the communications network is deployed.

One component of wireless communications networks where it may be challenging to obtain good performance and capacity is the antennas of network nodes configured for wireless communications; either to/from another network node, and/or to/from a wireless user terminal.

For example, multi-antenna transmission techniques are used in several wireless communication standards, e.g. the Long Term Evolution (LTE) telecommunications standard of the 3rd Generation Partnership Project (3GPP), in order to increase system capacity and coverage. A particular transmission mode (TM) is codebook-based precoding in which the radio base station (such as an evolved Node B, or eNB) of the network transmits one or several beam formed data streams to the wireless end-user terminals (denoted user equipment, or UE). The beam forming weights may be selected from a standardized codebook based on recommendations transmitted from the UE. In order for the UE to be able to recommend beam forming weights the radio base station first transmits pre-determined reference signals which are used by the UE to estimate the complex channel matrix between the radio base station and UE. This estimate may then be used to determine which weights in the codebook that for the UE will result in the best performance for the current channel state. Since there is only a finite number of eligible beam forming weights (as dictated by the codebook), only an index needs to be transmitted back from the UE to the radio base station. This index is referred to as a precoding matrix indicator (PMI). The radio base station may then select to transmit user data with the precoding matrix recommended by the UE, or with some other precoding matrix. For example, in transmission mode 4 (TM4) the radio base station may use another precoding matrix in the codebook, while in transmission mode 9 (TM9) there is no restriction on what precoding matrix for the radio base station to use. In the latter case, the codebook is only used to feedback quantized channel state information (CSI), for example by transmitting channel state reference signals (CSI-RS), whilst the demodulation of user data relies on precoded user-specific reference signals. For this reason, TM9 is sometimes referred to as non-codebook-based precoding.

Further, transmission mode 9 (TM9), defined in LTE release 10, is designed for up to eight antennas. The structure of the LTE release 10 codebook is specifically suited for a four column dual polarized uniform linear array antenna. With such types of antennas the beam forming gain, for example expressed in terms of antenna gain, is typically the same as the number of columns, i.e., a factor four. The beam forming gain is hence limited to be in the order of the number of CSI-RS ports; in case of dual polarized antennas typically half this number.

Hence, there is a need for improved beam forming.

SUMMARY

An object of embodiments herein is to provide efficient beam forming.

According to a first aspect there is presented a method for beam forming using an antenna array configured to transmit across an angular sector. The method comprises dividing the angular sector into at least two sub-sectors by applying respective port weights to respective physical antenna ports of the antenna array. The method comprises determining, for each sub-sector, a respective set of virtual antenna ports. The method comprises alternatingly transmitting a first set of reference signals for acquiring channel state information on the set of virtual antenna ports in each one of the at least two sub-sectors.

Advantageously this provides efficient beam forming.

Advantageously this enables improved spatial resolution which in turn may enable high signal, lower interference power, and/or improved spatial reuse, the latter yielding high capacity.

According to an embodiment the method further comprises transmitting also a second set of reference signals for channel state information on the set of virtual antenna ports in each one of the at least two sub-sectors. When transmitting the first set of reference signals in at least one of the at least two sub-sectors, the second set of reference signals is simultaneously transmitted in at least one other of the at least two sub-sectors.

Advantageously this enables a large number of antenna ports to be simultaneously used for transmitting reference signals.

Advantageously this enables denser sampling in the acquisition of possible response signals to the thus transmitted reference signals, thereby enabling higher beam forming gain, for example in subsequent data transmission.

According to a second aspect there is provided an antenna arrangement for beam forming. The antenna arrangement comprises a processing unit. The processing unit is configured to divide an angular sector of which an antenna array is configured to transmit across into at least two sub-sectors by applying respective port weights to respective physical antenna ports of the antenna array. The processing unit is configured to determine, for each sub-sector, a respective set of virtual antenna ports. The processing unit is configured to cause the antenna array to alternatingly transmit a first set of reference signals for acquiring channel state information on the set of virtual antenna ports in each one of the at least two sub-sectors.

According to a third aspect there is presented a network node comprising an antenna arrangement according to the second aspect.

According to a fourth aspect there is presented a wireless terminal comprising an antenna arrangement according to the second aspect.

According to a fifth aspect there is presented a computer program for beam forming, the computer program comprising computer program code which, when run on a processing unit, causes the processing unit to perform a method according to the first aspect.

According to a sixth aspect there is presented a computer program product comprising a computer program according to the fifth aspect and a computer readable means on which the computer program is stored.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step illustrated by dashed lines should be regarded as optional.

In general terms, the codebooks specified in the Long Term Evolutions (LTE) telecommunications standards have been designed for being used with one-dimensional (1-D) antenna arrays, typically uniform linear arrays. As noted above, the maximum number of antenna ports in the LTE release 10 codebook is eight. This puts a limit on the angular resolution as given by the CSI acquisition and the beam forming gain that can be achieved.

Transmission mode 9 (TM9), defined in LTE release 10, is designed for up to eight antennas. The structure of the LTE release 10 codebook is specifically suited for a four column dual polarized uniform linear array antenna. With such types of antennas the beam forming gain, for example expressed in terms of antenna gain, is typically the same as the number of columns, i.e., a factor four. The beam forming gain is hence limited to be in the order of the number of CSI-RS ports; in case of dual polarized antennas typically half this number.

By applying embodiments for beam forming as herein disclosed the codebook can be used also for larger antennas, with more columns (elements), thereby increasing the beam forming gain.

The embodiments disclosed thus herein relate to improved beam forming. In order to obtain such beam forming there is provided an antenna arrangement, a method performed by a processing unit, a computer program comprising code, for example in the form of a computer program product, that when run on a processing unit, causes the processing unit to perform the method.

Figure 1:
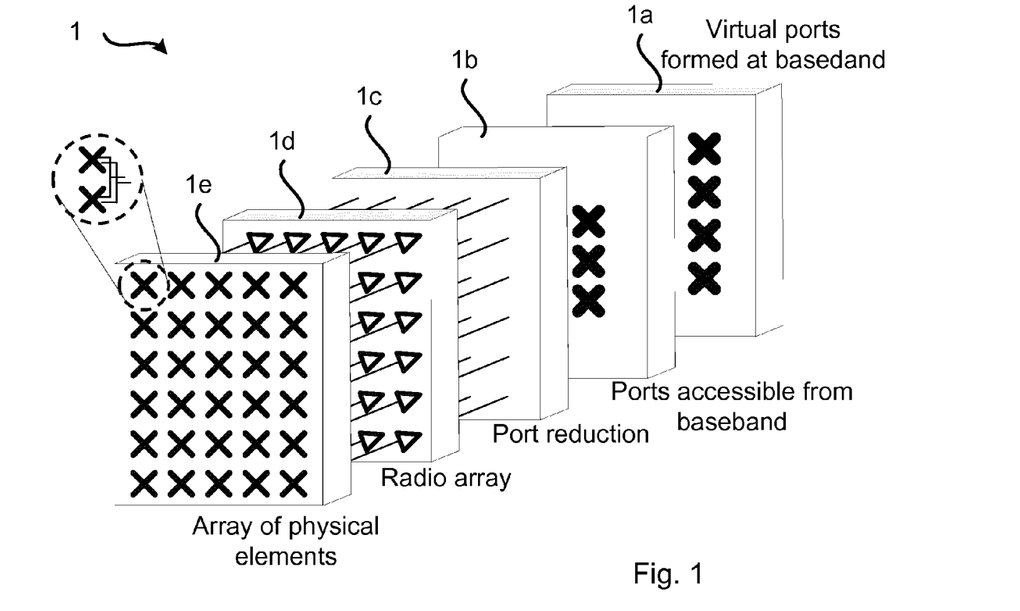
FIGS. 1 to 3 are schematic diagrams illustrating different aspects of antenna arrays according to embodiments.

FIG. 1 is a schematic block diagram illustrating an example architecture of an antenna array 1 for which embodiments presented herein can be applied. The antenna array 1 may be an N1-by-N2 two-dimensional antenna array, where N1>1 and N2>1. However, although illustrating such a two dimensional antenna array in FIG. 1, the herein disclosed embodiments are also applicable for a one dimensional antenna array. The antenna front end comprises an array 1e of physical antenna elements where each antenna element may be a subarray of several radiating antenna elements connected via a feed network to one physical antenna port (per polarization) for each physical element.

Each physical antenna port is connected to a radio chain as comprised in a radio array 1d. The number of antenna ports in block 1b accessible to baseband signal processing may be reduced via a port reduction block 1c that creates new antenna ports that are (linear) combinations of the input antenna ports. In the baseband signal processing block 1a virtual antenna ports may be created by matrix multiplications. These virtual antenna ports may be of different type. For example, in LTE they may for a radio base station be common reference signals (CRS) at ports 0-3, channel state information reference signals (CSI-RS) at port 15-22, and UE-specific reference signals at ports 7-14. In some implementations one or several blocks of the in the antenna array 1 in FIG. 1 may be removed.

Figure 3:
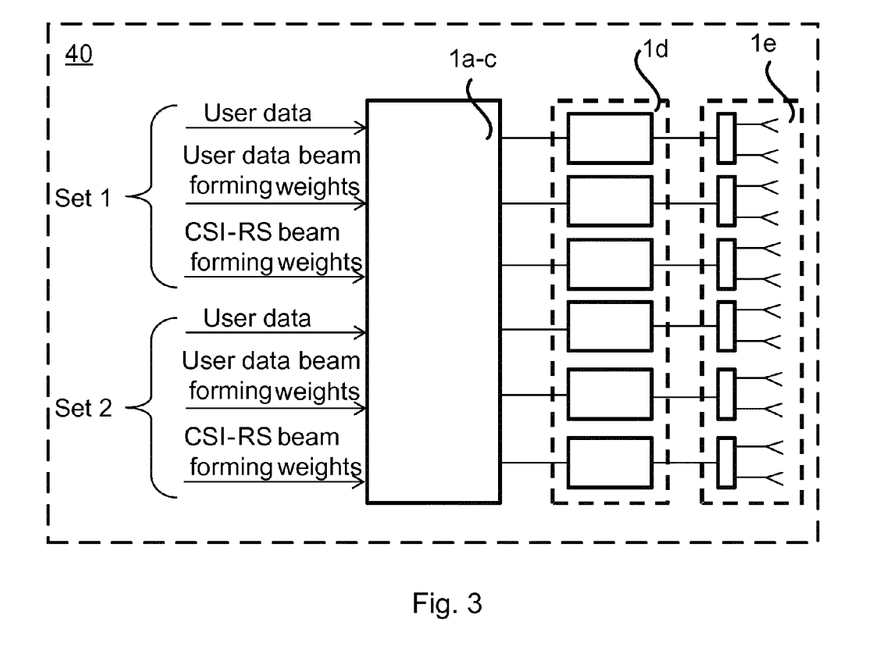

FIG. 3 is a schematic block diagram illustrating a possible implementation of the antenna array 1 of FIG. 1. The antenna array 1 may be part of an antenna arrangement 40. The antenna array 1 comprises a beam former comprising blocks 1a, 1b, 1c of FIG. 1, a radio array 1d and a physical antenna array 1e. The beam former 1a-c is configured to receive user data, beam forming weights for the user data, and beam forming weights for reference signals, such as CSI-RS. The beam former 1a-c may be configured to receive one set of user data, beam forming weights for the user data, and beam forming weights for reference signals. However, as will be further disclosed below, the beam former 1a-c may be configured to receive at least two sets (in FIG. 3 schematically illustrated by Set 1 and Set 2, respectively) of user data, beam forming weights for the user data, and beam forming weights for reference signals.

Figure 4A:
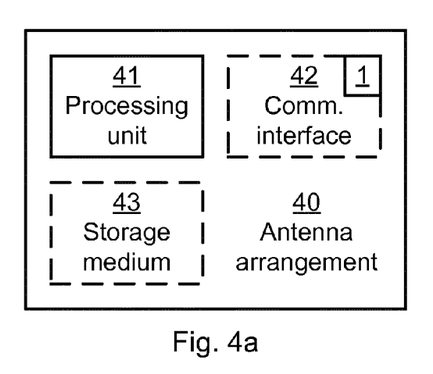
FIG. 4a is a block diagram showing functional units of an antenna arrangement according to an embodiment.

FIG. 4a schematically illustrates, in terms of a number of functional units, the components of an antenna arrangement 40 according to an embodiment. A processing unit 41 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 70 (as in FIG. 7), e.g. in the form of a storage medium 43. If implemented as an ASIC (or an FPGA) the processing unit 41 may by itself implement such instructions. Thus the processing unit 41 is thereby arranged to execute methods as herein disclosed. The storage medium 43 may also comprise persistent storage, which, for example, can be any single one or combination of magnetic memory, optical memory, solid state memory or even remotely mounted memory. The antenna arrangement 40 may further comprise a communications interface 42 for communications with radio transceiver devices, such as network nodes 51 and wireless terminals 61. As such the communications interface 42 may comprise one or more transmitters and receivers, comprising analogue and digital components and an antenna array 1 for radio communications. The processing unit 41 controls the general operation of the antenna arrangement 40 e.g. by sending data and control signals to the communications interface 42 and the storage medium 43, by receiving data and reports from the communications interface 42, and by retrieving data and instructions from the storage medium 43. Other components, as well as the related functionality, of the antenna arrangement 40 are omitted in order not to obscure the concepts presented herein.

Figure 4B:
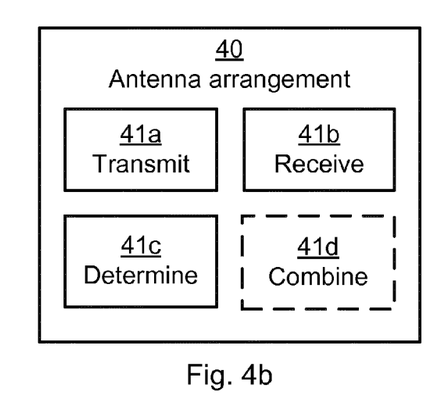
FIG. 4b is a block diagram showing functional modules of an antenna arrangement according to an embodiment.

FIG. 4b schematically illustrates, in terms of a number of functional modules, the components of an antenna arrangement 40 according to an embodiment. The antenna arrangement 4 of FIG. 4b comprises a divide module 41a, a determine module 41b, and a transmit module 41c. The antenna arrangement 40 of FIG. 4b may further comprises a number of optional functional modules, such as a receive module 41d. The functionality of each functional module 41a-d will be further disclosed below in the context of which the functional modules 41a-d may be used. In general terms, each functional module 41a-d may be implemented in hardware or in software. The processing unit 41 may thus be arranged to from the storage medium 43 fetch instructions as provided by a functional module 41a-d and to execute these instructions, thereby performing any steps as will be disclosed hereinafter.

Figure 5:
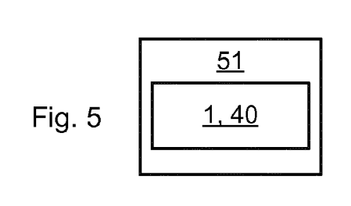
FIG. 5 schematically illustrates a network node comprising an antenna arrangement according to embodiments.
Figure 6:
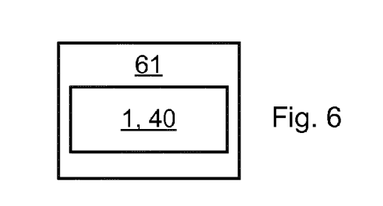
FIG. 6 schematically illustrates a wireless terminal comprising an antenna arrangement according to embodiments.

The antenna array 1 and/or the antenna arrangement 40 may be provided as integrated circuits, as standalone devices or as a part of a further device. For example, the antenna array 1 and/or antenna arrangement 40 may be provided in a radio transceiver device, such as in a network node 51 and/or a wireless terminal 61. FIG. 5 illustrates a network node 51 comprising at least one antenna array 1 and/or antenna arrangement 40 as herein disclosed. The network node 51 may be a BTS, a NodeB, an eNB, a repeater, a backhaul node, or the like. FIG. 6 illustrates a wireless terminal 61 comprising at least one antenna array 1 and/or antenna arrangement 40 as herein disclosed. The wireless terminal 61 may be a user equipment (UE), a mobile phone, a tablet computer, a laptop computer, etc. or the like.

The antenna array 1 and/or antenna arrangement 40 may be provided as an integral part of the further device. That is, the components of the antenna array 1 and/or antenna arrangement 40 may be integrated with other components of the further device; some components of the further device and the antenna array 1 and/or antenna arrangement 40 may be shared. For example, if the further device as such comprises a processing unit, this processing unit may be arranged to perform the actions of the processing unit 41 associated with the antenna arrangement 40. Alternatively the antenna array 1 and/or antenna arrangement 40 may be provided as separate units in the further device.

Figure 7:
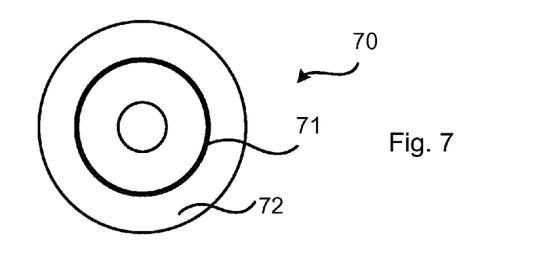
FIG. 7 schematically illustrates a computer program product according to an embodiment.
Figures 8, 9:
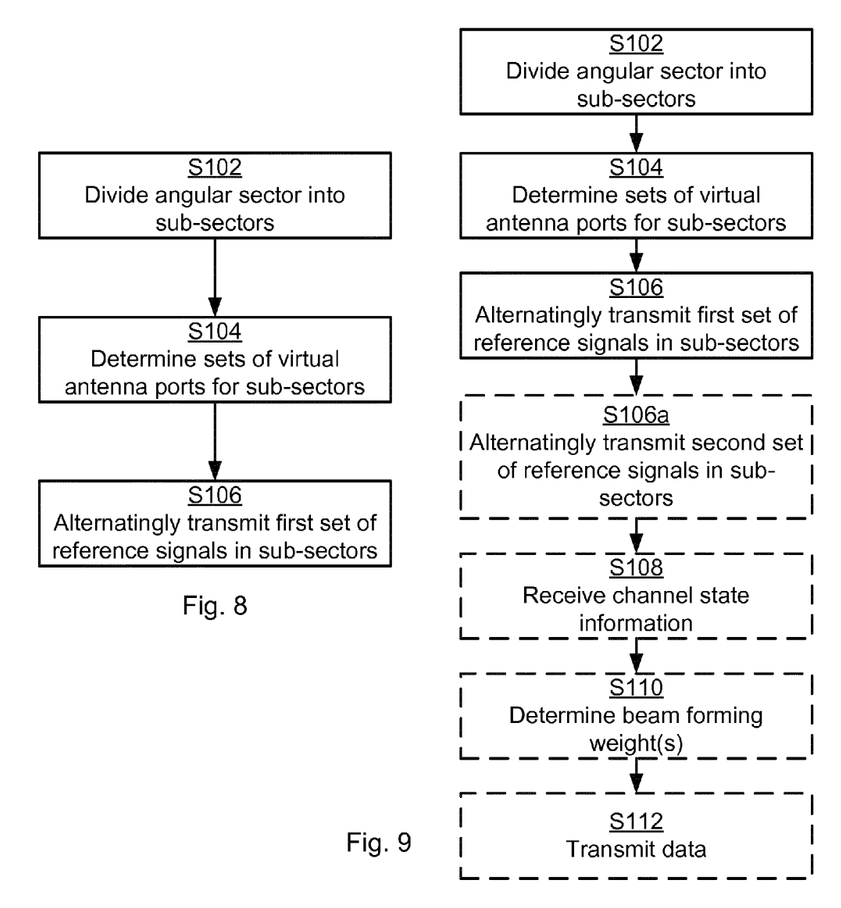
FIGS. 8 and 9 are flowcharts of methods according to embodiments.

FIGS. 8 and 9 are flow chart illustrating embodiments of methods for beam forming. The methods are performed by the processing unit 41. The methods are advantageously provided as computer programs 71. FIG. 7 shows one example of a computer program product 70 comprising computer readable means 72. On this computer readable means 72, a computer program 71 can be stored, which computer program 71 can cause the processing unit 41 and thereto operatively coupled entities and devices, such as the communications interface 42 (and hence the antenna array 1) and the storage medium 43, to execute methods according to embodiments described herein. The computer program 71 and/or computer program product 70 may thus provide means for performing any steps as herein disclosed.

In the example of FIG. 7, the computer program product 70 is illustrated as an optical disc, such as a CD (compact disc) or a DVD (digital versatile disc) or a Blu-Ray disc. The computer program product 70 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 71 is here schematically shown as a track on the depicted optical disk, the computer program 71 can be stored in any way which is suitable for the computer program product 70.

Reference is now made to FIG. 8 illustrating a method for beam forming using an antenna array 1 according to an embodiment.

The antenna array 1 is configured to transmit across an angular sector. The method comprises in a step S102 dividing the angular sector into at least two sub-sectors. The angular sector is divided by respective port weights being applied to respective physical antenna ports of the antenna array. The processing unit 41 may be configured to perform step S102.

Reference signals are to be transmitted in the sub-sectors. In order to do so, virtual antenna ports for the reference signals are determined. Hence the method comprises in a step S104 determining, for each sub-sector, a respective set of virtual antenna ports. The processing unit 41 may be configured to perform step S104.

Figure 2:
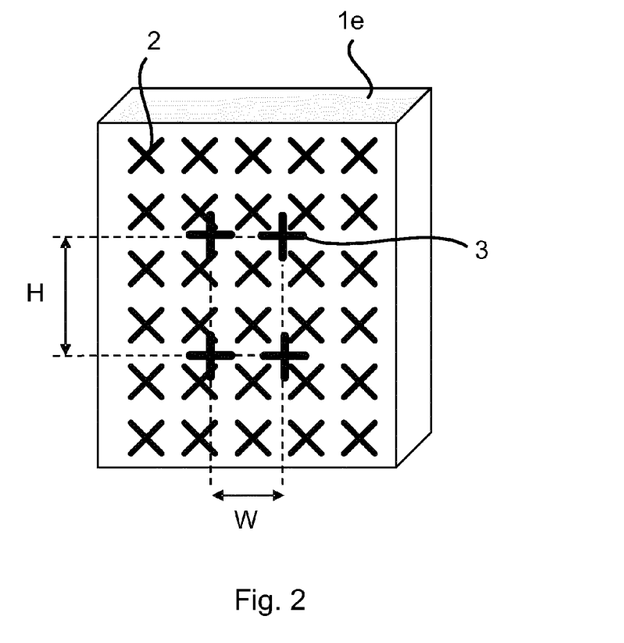

FIG. 2 schematically illustrates phase center positions and phase center separations of virtual antenna ports 3 according to an embodiment. The vertical phase center separation has a height H and the horizontal phase center separation has a width W. Also the physical antenna elements 2 are illustrated for reference. The virtual antenna ports 3 may be created by an antenna architecture such as the one in FIG. 1. In FIG. 2 the virtual antenna ports form a 2-by-2 antenna array.

Once the virtual antenna ports have been determined, the reference signals may be transmitted. The method comprises in a step S106 alternatingly transmitting a first set of reference signals for acquiring channel state information on the set of virtual antenna ports in each one of the at least two sub-sectors. The processing unit 41 may be configured to cause the antenna array 1 to perform step S106.

As will be further disclosed below, total coverage of the angular sector (which may be an area or a volume) is achieved either over time by transmitting reference signals in one sub-sectors at a time, by transmitting the reference signals on alternating frequency sub-band, or by transmitting the reference signals using different code resources.

The spatial resolution from beam forming, for example via TM9 or TM10, may thereby be improved compared to a state of the art implementation for transmitting reference signals. The improved spatial resolution is obtained by means of using a larger antenna array aperture than state of the art, enabling division of a desired spatial coverage area (or volume) into two or more sub-sectors (defining a sub-area or a sub-volume of the coverage area or volume).

The improved resolution may require an increased number of accessible antenna elements than a state of the art implementation. Beam forming according to herein disclosed embodiments allows for use of a larger antenna than state of the art, thereby offering improved spatial resolution. With a larger antenna array, narrower beams, over which reference signals and/or user data are transmitted, may be formed.

Figure 10:
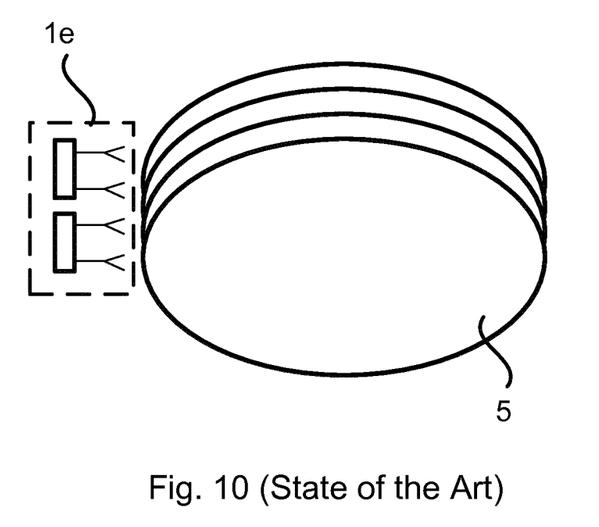
FIG. 10 to schematically illustrates transmission of reference signals according to state of the art.
Figure 11:
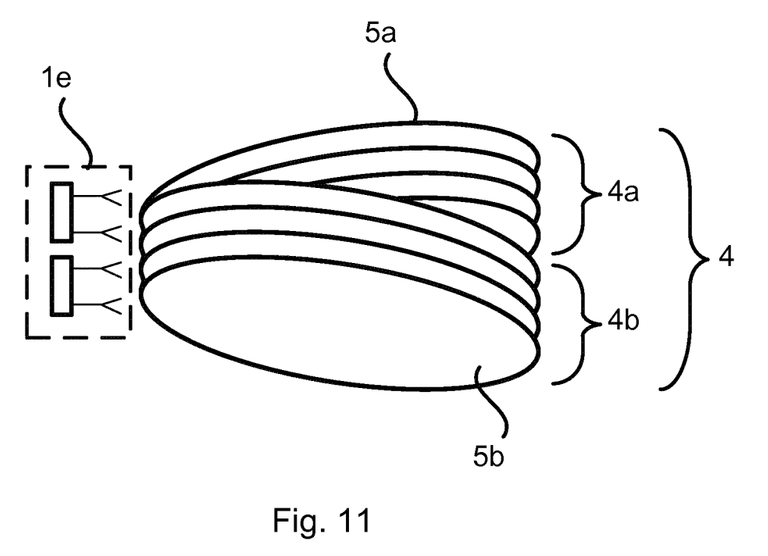
FIG. 11 schematically illustrates transmission of reference signals using beam forming according to embodiments.

FIGS. 10 and 11 schematically illustrate schemes for transmitting reference signals from an antenna array according to state of the art and according to an embodiment for beam forming as herein disclosed, respectively. In more detail, in FIG. 11 is shown an example for a one dimensional antenna array 1 where the total coverage area (i.e., angular sector 4) of the antenna array is divided into two separate sub-sectors 4*a*, 4*b*, each sub-sector being covered by a set of beams 5*a*, 5*b* transmitting reference signals. All beams (within a set or sub-sector) have the same power pattern. In the example of FIG. 11 the narrower beams (compared to the beams 5 of FIG. 10) are formed by transmitting each reference signal over two adjacent antenna elements. This means that the phase center separation (see, FIG. 2) is increased a factor of two and consequently that the resolution of the beams as formed by the codebook is improved a factor of two.

Embodiments relating to further details of beam forming using an antenna array 1 will now be disclosed.

All of the at least two sub-sectors may collectively have the same coverage as the total angular sector across which the antenna array 1 is configured to transmit.

The sub-sectors may have the same or different widths. For example, at least two of the least two sub-sectors may have different widths.

A phase-center separation (see, FIG. 2) between the virtual antenna ports in each set of virtual antenna ports may be determined such that codebook beams are matched to sub-sector widths.

The port weights may be determined such that, for each sub-sector, the radiation pattern of the virtual antenna ports covers the sub-sector.

The herein disclosed embodiments are applicable for different types of antenna arrays 1. For example, according to an embodiment the antenna array is an N1-by-N2 two-dimensional antenna array, where N1>1 and N2>1 are integers. However, according to other embodiments the antenna array 1 may have another shape, for example being a circular two-dimensional antenna array or a one dimensional antenna array.

There may be different ways to alternately transmitting the reference signals, as in step S106. For example, the reference signals may be alternatingly transmitted in the time domain, in the frequency domain, and in the code domain.

In this respect, multiple CSI-RS processes in LTE are not transmitted completely simultaneously in completely the same frequency. Some CSI-RS signals are transmitted in different physical resource elements, i.e., using different subcarriers and orthogonal frequency-division multiplexing (OFDM) symbols. However, the multiple CSI-RS processes are transmitted in the same physical resource block (consisting of 12 subcarriers and 7 OFDM symbols) so at this level of granularity in the time-frequency grid they are regarded as transmitted simultaneously in the same frequency band. Thus, when transmitting simultaneously at the same frequency in LTE is meant in the same physical resource blocks.

According to one embodiment the reference signals are alternatingly transmitted over time (and in the same frequency band). For example, reference signals for one of the at least two sub-sectors may be transmitted in a first time slot, and reference signals for another of the at least two sub-sectors may be transmitted (in the same frequency band) in a second time slot. After having transmitted reference signals in the second time slot, reference signals may again be transmitted as in the first time slot, and so on. For example, reference signals for one of the at least two sub-sectors may be transmitted at time slot n (or every 2n:th time slot) and reference signals for another of the at least two sub-sectors may be transmitted at time slot n+1 (or every 2n+1:th), where n is an integer.

According to one embodiment the reference signals are alternatingly transmitted over frequency (and simultaneously over time). For example, reference signals for one of the at least two sub-sectors may be transmitted in a first frequency subband, and reference signals for another of the at least two sub-sectors may be transmitted (simultaneously over time) in a second frequency subband.

According to one embodiment the reference signals are transmitted using different code resources (and simultaneously over time and/or in the same frequency band). The code resources may be based on binary block codes. For example, reference signals for one of the at least two sub-sectors may be transmitted using a first code resource, and reference signals for another of the at least two sub-sectors may be transmitted (simultaneously over time and/or in the same frequency band) using a second code resource. The first code resource and the second code resource may be orthogonal in relation to each other.

Reference is now made to FIG. 9 illustrating methods for beam forming using an antenna array 1 according to further embodiments.

In general terms, the reference signals transmitted in step S106 are intended to be received by a wireless transceiver device. Upon receiving the reference signals the wireless transceiver device may in return transmit channel state information back towards the device comprising the antenna array 1 and/or antenna arrangement 40.

Particularly, according to an embodiment the method comprises an optional step S108 of receiving channel state information from a wireless transceiver device. The channel state information corresponds to the reference signals transmitted in step S106. The processing unit 41 may be configured to perform step S108. Beam forming weights may be determined based on the received channel state information. Hence, according to this embodiment the method comprises an optional step S110 of determining at least one beam forming weight for the wireless transceiver device based on the received channel state information. The processing unit 41 may be configured to perform step S110.

The antenna array 1 and/or antenna arrangement 40 may transmit data to the wireless transceiver device. Particularly, the data may be transmitted using the beam forming weight(s) determined in step S110. Thus, according to an embodiment the method comprises an optional step S112 of transmitting data to the wireless transceiver device using the determined at least one beam forming weight. The processing unit 41 may be configured to cause the antenna array 1 and/or antenna arrangement 40 to perform step S110.

There may be different ways to determine the beam forming weight(s) in step S110. For example the at least one beam forming weight may be based on channel state information received from the wireless transceiver device in one of the at least two sub-sectors. For example the at least one beam forming weight may be based on channel state information received from the wireless transceiver device in at least two of the at least two sub-sectors.

The reference signals may be channel state information reference signals (CSI-RS). As noted above, a network node 51 may comprise a two dimensional antenna arrangement 1 as herein disclosed. The network node 51 may thus be configured to transmit CSI-RS as outlined in step S106.

The channel information may be a precoding matrix indicator (PMI) report. The network node 51 may thus be configured to receive PMI reports as outlined in step S108. Based on, for example, such PMI reports from the radio transceiver device receiving the reference signals transmitted in S102, beam forming may be performed using the whole antenna array.

For example, PMI reports from a wireless terminal 61 may be used to determine the direction to the dominant propagation path to this wireless terminal 61. This direction may then be used to determine beam forming weights as in step S110 that create a beam pointing in this direction.

The reference signals may be sounding reference signals (SRS). As noted above, a wireless terminal 61 may comprise a two dimensional antenna arrangement 1 as herein disclosed. The wireless terminal 61 may thus be configured to transmit SRS as outlined in step S106.

As noted above, the beam former 1a-c of FIG. 3 may be configured to receive at least two sets of user data, beam forming weights for the user data, and beam forming weights for reference signals. Further details relating thereto will now be disclosed. According to embodiments multiple sets of reference signals, such as multiple CSI-RS processes, may simultaneously be transmitted from the antenna array 1. The multiple sets of reference signals may be used for increasing the number of antenna ports that are used for CSI estimation. This may improve the angular resolution in the CSI estimation and thereby make it useful to use a correspondingly increased number of antenna ports for the beam forming of the user data, which in turn may improve the beam forming gain.

Therefore, according to an embodiment the method further comprises an optional step S106a of alternatingly transmitting also a second set of reference signals for channel state information on the set of virtual antenna ports in each one of the at least two sub-sectors. Also according to this embodiment, when transmitting the first set of reference signals in at least one of the at least two sub-sectors, the second set of reference signals is simultaneously transmitted in at least one other of the at least two sub-sectors.

This may alleviate the need for several CSI-RS transmissions of a single process over multiple time slots (or frequency subbands, see above), therefore relaxing requirements on the channel being stationary during alternatingly transmitting the reference signals. Another possible advantage with this approach exists if the radio transceiver device receiving the reference signals transmitted in S106 reports CSI based on an average of several CSI-RS transmissions over time or frequency. Then the CSI based on different angular sectors may be mixed up. By using simultaneous transmission of multiple CSI-RS processes there may be no such problem.

Given for example the set of 8 CSI-RS as defined in 3GPP Release 10, a user unique beam can be determined with a beam width approximately $1/(8/2)=\frac{1}{4}$ of the beam width for an individual CSI-RS port. This would be the case for a state of the art implementation if the CSI-RS signals are applied directly onto the antenna ports of a four column dual polarized antenna array.

The reason for achieving only 4 times improved resolution compared to state of the art is that it has here been assumed that the antenna array 1 has 4 sets of ports; one set per polarization, and that the column spacing is such that the codebook beams cover the entire angular sector of the antenna array 1 and that these four ports (or phase centers) are located on a line (i.e., a one dimensional antenna array). For beam forming in two dimensions (enabled e.g., by locating the beam ports on a plane instead of a line) the spatial resolution is typically improved by a factor of two per dimension.

In order to ensure that, for example, a wireless terminal 61 located anywhere in the area covered of, for example, a network node 51, will receive unique CSI-RS signals these are transmitted in each sub-sector either on different time instants, on different sub-band in the frequency domain, or using different code resources. The network node 51 may need to combine feedback reports from the wireless terminal 61 for different time instants, frequency blocks, or code resources, and make a joint decision on how to beam form the data transmission to the wireless terminal 61.

One particular embodiment incorporating features and steps as disclosed above will now be disclosed. This particular embodiment relates to a method as performed by the network node 51 and hence the radio transceiver device is embodied as the wireless terminal 61.

S202: The network node 51 divides the angular sector covered by its antenna array 1 into a number of sub-sectors. The sub-sectors can have the same or different widths but together they span the angular coverage of the antenna array 1 and they could be essentially mutually non-overlapping. Performing S202 may include performing step S102.

S204: The network node 51 for each sub-sector, creates a set of virtual antenna ports where each virtual antenna port has a radiation pattern that covers a sub-sector and where the phase-center separation between the virtual antenna ports in this set is such that that the transmission beams in the codebook will be matched to the sub-sector width. Performing S204 may include performing step S104.

S206: The network node 51 transmits CSI-RS on the virtual antenna ports in one sub-sector at a time, or at the same time in different frequency subbands, or using different code resources. Performing S206 may include performing any of step S106 and S106a.

S208: The network node 51 based on received channel-state reports from wireless terminals 61 in the different sub-sectors, determine beam forming weights to be used in the data transmission. The weights may be based on channel-state reports from a single sub-sector or on a combination of channel-state reports from several sub-sectors. The latter can be advantageous for wireless terminals 61 that are located close to the border between two sub-sectors. Performing S208 may include performing steps S108 and S110.

S210: The network node 51 transmits user data using beam forming with the weights determined in S208. Performing S210 may include performing step S112.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For examples, although relating to LTE releases 10 and 11, the herein disclosed embodiments may also be applicable to earlier LTE releases by using a similar transmission scheme for the cell-specific reference signals and, e.g., transmission mode 7 (TM7). For examples, although using LTE specific terminology, the herein disclosed embodiments may also be applicable to communications networks not based on LTE, mutatis mutandis.

The invention claimed is:

1. A method for beam forming using an antenna array having physical antenna ports and having a total coverage area, said method comprising:
    dividing the total coverage area into a plurality of coverage areas by applying respective port weights to respective physical antenna ports of the antenna array, said plurality of coverage areas comprising a first coverage area that is less than the total coverage area and a second coverage area that is less than the total coverage area, wherein the first coverage area is different than the second coverage area;
    determining, for the first coverage area, a first set of beamformed virtual antenna ports of the antenna array;
    determining, for the second coverage area, a second set of beamformed virtual antenna ports of the antenna array;
    transmitting, during a first transmission interval and using a first set of subcarriers, a first set of reference signals for acquiring channel state information using only the first set of beamformed virtual antenna ports of the antenna array, wherein the first set of beamformed virtual antenna ports covers only the first coverage area such that the first set of reference signals transmitted using only the first set of beamformed virtual antenna ports can be received by a receiving device located in the first coverage area; and
    transmitting, during a second transmission interval different than the first transmission time interval or using a second set of subcarriers different than the first set of subcarriers, the first set of reference signals using only the second set of beamformed virtual antenna ports of the antenna array, wherein the second set of beamformed virtual antenna ports covers only the second coverage area such that the first set of reference signals transmitted using only the second set of beamformed virtual antenna ports can be received by a receiving device located in the second coverage area.

2. The method according to claim 1, further comprising:
    receiving channel state information from a wireless transceiver device corresponding to the transmitted first set of reference signals; and
    determining at least one beam forming weight for the wireless transceiver device based on the received channel state information.

3. The method according to claim 2, further comprising: transmitting data to the wireless transceiver device using the determined at least one beam forming weight.

4. The method according to claim 2, wherein the at least one beam forming weight is based on channel state information received from the wireless transceiver device in one of the plurality of coverage areas.

5. The method according to claim 2, wherein the at least one beam forming weight is based on channel state information received from the wireless transceiver device in at least two of the plurality of coverage areas.

6. The method according to claim 1, wherein all of the plurality of coverage areas collectively have a same coverage as the total coverage area.

7. The method according to claim 1, wherein at least two of the plurality of coverage areas have different widths.

8. The method according to claim 1, wherein a phase-center separation having a height H and width W between virtual antenna ports in each set of virtual antenna ports is determined such that codebook beams are matched to coverage area widths.

9. The method according to claim 1, wherein the respective port weights are determined such that, for the first coverage area, a first radiation pattern of the first set of beamformed virtual antenna ports covers the first coverage area, and for the second coverage area, a second radiation pattern of the second set of beamformed virtual antenna ports covers the second coverage area.

10. The method according to claim 1, wherein the first set of reference signals are alternatingly transmitted over time in respective ones of the plurality of coverage areas.

11. The method according to claim 1, wherein the first set of reference signals are alternatingly transmitted over frequency, wherein reference signals for one of the plurality of coverage areas are transmitted in a first frequency subband, and wherein reference signals for another of the plurality of coverage areas are transmitted in a second frequency subband different from the first frequency subband.

12. The method according to claim 1, wherein the first set of reference signals are alternatingly transmitted using different code resources.

13. The method according to claim 1, wherein the antenna array is an N1-by-N2 two-dimensional antenna array, where N1>1 and N2>1.

14. The method according to claim 1, wherein the first set of reference signals are channel state information reference signals, CSI-RS.

15. The method according to claim 1, wherein the reference signals are sounding reference signals, SRS.

16. The method according to claim 1, further comprising:
    transmitting also a second set of reference signals for channel state information on the first and second sets of virtual antenna ports in each one of the plurality of coverage areas; and wherein
    when transmitting said first set of reference signals in at least one of the plurality of coverage areas, simultaneously transmitting said second set of reference signals in at least one other of the plurality of coverage areas.

17. An antenna arrangement for beam forming comprising an antenna array comprising a beam former, a radio array, a physical antenna array, and a processing unit configured to:
    divide a total coverage area of which an antenna array is configured to transmit across into a plurality of coverage areas by applying respective port weights to respective physical antenna ports of the antenna array, said plurality of coverage areas comprising a first coverage area that is less than the total coverage area and a second coverage area that is less than the total coverage area, wherein the first coverage area is different than the second coverage area;
    determine, for the first coverage area, a first set of beamformed virtual antenna ports;

determine, for the second coverage area, a second set of beamformed virtual antenna ports;

cause the antenna array to transmit, during a first transmission interval and using a first set of subcarriers, a first set of reference signals for acquiring channel state information using only the first set of beamformed virtual antenna ports, wherein the first set of beamformed virtual antenna ports covers only the first coverage area such that the first set of reference signals transmitted using only the first set of beamformed virtual antenna ports can be received by a receiving device located in the first coverage area; and cause the antenna array to transmit, during a second transmission interval different than the first transmission time interval or using a second set of subcarriers different than the first set of subcarriers, the first set of reference signals for acquiring channel state information using only the second set of beamformed virtual antenna ports, wherein the second set of beamformed virtual antenna ports covers only the second coverage area such that the first set of reference signals transmitted using only the second set of beamformed virtual antenna ports can be received by a receiving device located in the second coverage area.

18. The antenna arrangement according to claim 17, wherein the processing unit is further configured to:

receive channel state information from a wireless transceiver device corresponding to the transmitted first set of reference signals; and determine at least one beam forming weight for the wireless transceiver device based on the received channel state information.

19. The antenna arrangement according to claim 18, wherein the processing unit is further configured to:

transmit data to the wireless transceiver device using the determined at least one beam forming weight.

20. The antenna arrangement according to claim 17, wherein the processing unit is further configured to:

transmit also a second set of reference signals for channel state information on the first and second sets of virtual antenna ports in each one of the plurality of coverage areas; and wherein when configured to transmit said first set of reference signals in at least one of the plurality of coverage areas, being configured to simultaneously transmit said second set of reference signals in at least one other of the plurality of coverage areas.

21. A network node comprising an antenna arrangement for beam forming, the antenna arrangement comprising an antenna array, and the antenna array comprising a beam former, a radio array a physical antenna array, and a processing unit configured to:

divide a total coverage area of which an antenna array is configured to transmit across into a plurality of coverage areas by applying respective port weights to respective physical antenna ports of the antenna array, said plurality of coverage areas comprising a first coverage area that is less than the total coverage area and a second coverage area that is less than the total coverage area, wherein the first coverage area is different than the second coverage area;

determine, for the first coverage area, a first set of beamformed virtual antenna ports;

determine, for the second coverage area, a second set of beamformed virtual antenna ports;

cause the antenna array to transmit, during a first transmission interval and using a first set of subcarriers, a first set of reference signals for acquiring channel state information using only the first set of beamformed virtual antenna ports, wherein the first set of beamformed virtual antenna ports covers only the first coverage area such that the first set of reference signals transmitted using only the first set of beamformed virtual antenna ports can be received by a receiving device located in the first coverage area; and cause the antenna array to transmit, during a second transmission interval different the first transmission time interval or using a second set of subcarriers different than the first set of subcarriers, the first set of reference signals for acquiring channel state information using only the second set of beamformed virtual antenna ports, wherein the second set of beamformed virtual antenna ports covers only the second coverage area such that the first set of reference signals transmitted using only the second set of beamformed virtual antenna ports can be received by a receiving device located in the second coverage area.

22. A wireless terminal comprising an antenna arrangement for beam forming, the antenna arrangement comprising an antenna array, and the antenna array comprising a beam former, a radio array, a physical antenna array, and a processing unit configured to:

divide a total coverage area of which an antenna array is configured to transmit across into a plurality of coverage areas by applying respective port weights to respective physical antenna ports of the antenna array said plurality of coverage areas comprising a first coverage area that is less than the total coverage area and a second coverage area that is less than the total coverage area, wherein the first coverage area is different than the second coverage area;

determine, for the first coverage area, a first set of beamformed virtual antenna ports;

determine, for the second coverage area, a second set of beamformed virtual antenna ports;

cause the antenna array to transmit, during a first transmission interval and using a first set of subcarriers, a first set of reference signals for acquiring channel state information using only the first set of beamformed virtual antenna ports, wherein the first set of beamformed virtual antenna ports covers only the first coverage area such that the first set of reference signals transmitted using only the first set of beamformed virtual antenna ports can be received by a receiving device located in the first coverage area; and cause the antenna array to transmit, during a second transmission interval different than the first transmission time interval or using a second set of subcarriers different than the first set of subcarriers, the first set of reference signals for acquiring channel state information using only the second set of beamformed virtual antenna ports, wherein the second set of beamformed virtual antenna ports covers only the second coverage area such that the first set of reference signals transmitted using only the second set of beamformed virtual antenna ports can be received by a receiving device located in the second coverage area.

23. A non-transitory computer-readable medium with computer instructions for beam forming using an antenna array having physical antenna ports and having a total coverage area, which, when said computer instructions are run on a processing unit, causes the processing unit to:

divide the total coverage area into a plurality of coverage areas by applying respective port weights to respective physical antenna ports of the antenna array, said plurality of coverage areas comprising a first coverage area that is less than the total coverage area and a second coverage area that is less than the total coverage area, wherein the first coverage area is different than the second coverage area;

determine, for the first coverage area, a first set of beamformed virtual antenna ports of the antenna array;

determine, for the second coverage area, a second set of beamformed virtual antenna ports of the antenna array;

cause the antenna array to transmit, during a first transmission interval and using a first set of subcarriers, a first set of reference signals for acquiring channel state information using only the first set of beamformed virtual antenna ports, wherein the first set of beamformed virtual antenna ports covers only the first coverage area such that the first set of reference signals transmitted using only the first set of beamformed virtual antenna ports can be received by a receiving device located in the first coverage area; and cause the antenna array to transmit, during a second transmission interval different than the first transmission time interval or using a second set of subcarriers different than the first set of subcarriers, the first set of reference signals for acquiring channel state information using only the second set of beamformed virtual antenna ports of the antenna array, wherein the second set of beamformed virtual antenna ports covers only the second coverage area such that the first set of reference signals transmitted using only the second set of beamformed virtual antenna ports can be received by a receiving device located in the second coverage area.

24. A computer program product comprising a computer program stored on a non-transitory computer readable medium according to claim 23.

* * * * *

UNITED STATES PATENT AND TRADEMARK OFFICE
CERTIFICATE OF CORRECTION

PATENT NO. : 9,960,828 B2
APPLICATION NO. : 14/358014
DATED : May 1, 2018
INVENTOR(S) : Petersson et al.

Page 1 of 1

It is certified that error appears in the above-identified patent and that said Letters Patent is hereby corrected as shown below:

In the Specification

In Column 1, Lines 60-61, delete "channel state reference signals (CSI-RS)," and insert -- channel state information reference signals (CSI-RS), --, therefor.

In Column 3, Line 46, delete "FIG. 10 to" and insert -- FIG. 10 --, therefor.

In Column 9, Line 22, delete "antenna arrangement 1" and insert -- antenna arrangement 40 --, therefor.

In Column 9, Line 39, delete "antenna arrangement 1" and insert -- antenna arrangement 40 --, therefor.

In the Claims

In Column 13, Line 51, in Claim 21, delete "a radio array" and insert -- a radio array, --, therefor.

In Column 14, Line 10, in Claim 21, delete "different" and insert -- different than --, therefor.

In Column 14, Line 29, in Claim 22, delete "the antenna array" and insert -- the antenna array, --, therefor.

Signed and Sealed this
Twenty-second Day of September, 2020

Andrei Iancu
*Director of the United States Patent and Trademark Office*